(12) United States Patent
Nguyen et al.

(10) Patent No.: US 6,716,341 B2
(45) Date of Patent: Apr. 6, 2004

(54) FLUID FILTER ASSEMBLY

(75) Inventors: Ledu Q. Nguyen, Fayetteville, NC (US); Allen B. Wright, Hope Mills, NC (US); Jorge A. Trevino, Fayetteville, NC (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/106,619

(22) Filed: Mar. 26, 2002

(65) Prior Publication Data

US 2003/0183564 A1 Oct. 2, 2003

(51) Int. Cl.[7] .............................. B01D 35/02
(52) U.S. Cl. .................... 210/168; 210/171; 210/416.5; 210/453; 210/454; 210/456; 210/493.2; 210/497.01; 55/385.3; 55/467; 55/498
(58) Field of Search ................ 210/168, 171, 210/172, 416.1, 416.5, 435, 450, 453, 454, 455, 456, 459, 493.1, 493.2, 497.01; 184/6.24, 106; 475/159, 160

(56) References Cited

U.S. PATENT DOCUMENTS

| | | | |
|---|---|---|---|
| 4,889,621 A | | 12/1989 | Yamada et al. |
| 5,720,788 A | * | 2/1998 | Puckett et al. ................ 55/337 |
| 5,800,584 A | * | 9/1998 | Hinderer et al. .............. 55/482 |
| 6,019,890 A | * | 2/2000 | Janik et al. ................. 210/117 |
| 6,506,302 B2 | * | 1/2003 | Janik .......................... 210/232 |

* cited by examiner

*Primary Examiner*—Matthew O. Savage
(74) *Attorney, Agent, or Firm*—Barnes & Thornburg

(57) ABSTRACT

A fluid filter assembly includes a shroud containing a filter module. A fluid pump is coupled to the shroud and operated to draw transmission fluid from a fluid reservoir in a transaxle housing into the shroud and through the filter module in the shroud to produce a stream of filtered transmission fluid to be pumped to a transmission or other destination in the transaxle housing. The shroud includes a filter housing containing the filter module and a mount flange cantilevered to the filter housing and adapted to mate with the fluid pump.

17 Claims, 5 Drawing Sheets

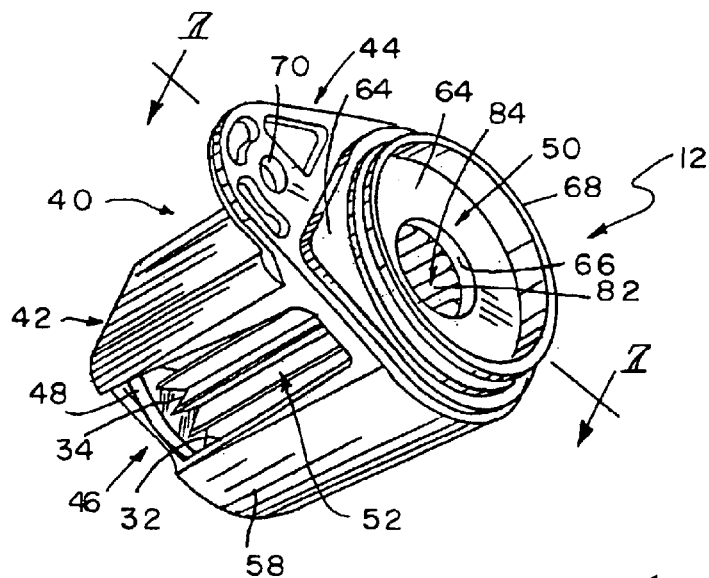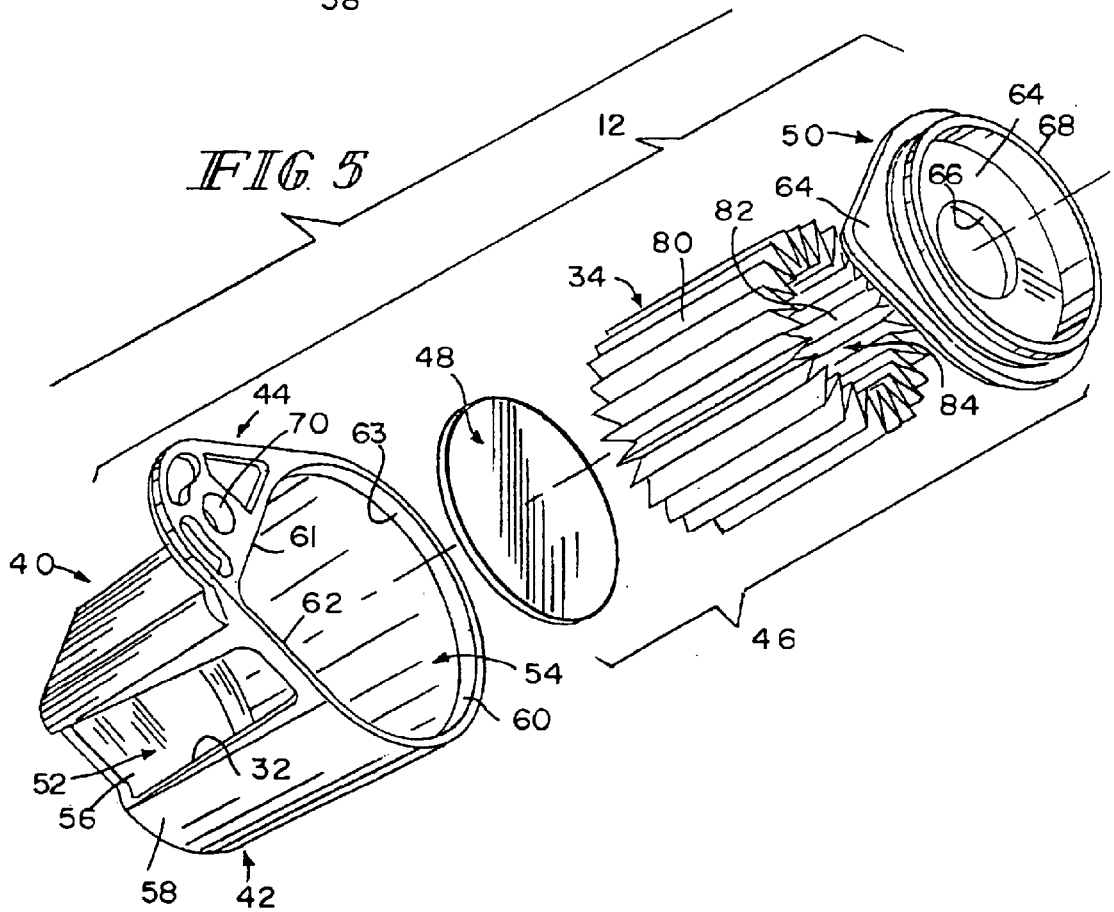

FLUID FILTER ASSEMBLY

BACKGROUND

The present disclosure relates to fluid filters, and in particular, to filters for transmission fluid. More particularly, the present disclosure relates to fluid filter assemblies for use with fluid pumps in vehicle transmission or transaxle systems.

A transaxle is a drive setup in which the transmission gearbox, clutch (if equipped), final drive, and differential are combined into a single unit connected directly to the drive shaft. It is used in rear-engine cars like the Corvair and Volkswagon, but is also found in some front-wheel drive cars and some performance cars where a front engine/rear transaxle gives better overall balance. Such transaxles include various bearings and gears that are typically lubricated and cooled by means of a fluid circulating through the transaxle. During transaxle operation, such fluid can become contaminated with particles or other contaminants.

SUMMARY

A fluid filter assembly in accordance with the present disclosure comprises a shroud made of a plastics material. The shroud includes a filter housing and a mount flange coupled to the filter housing and adapted to mate with a fluid pump mounted in a transaxle housing. The filter housing is formed to include a filter chamber containing a filter module and a side inlet port positioned to lie in the transaxle housing to cause transmission fluid to flow from a fluid reservoir in the transaxle housing into the filter chamber through the side inlet port. A base is coupled to the filter housing to close a filter-receiving opening formed therein. The base is formed to include a fluid outlet port to discharge filtered fluid from the filter chamber into the fluid pump mounted in the transaxle housing.

In illustrative embodiments, the shroud is monolithic and the mount flange is cantilevered to a side wall of the filter housing to extend in a direction away from the filter-receiving opening. The filter housing includes an end wall positioned to lie in spaced-apart relation to the base to cause the side wall to extend between the end wall and the base. The side wall is formed to include the side inlet port and the filter housing is located to cause the side inlet port to lie below the level of transmission fluid in the fluid reservoir so that transmission fluid will pass into the filter chamber and through the filter module during operation of the fluid pump.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 5 is a perspective assembly view of the transaxle filter of FIGS. 2–4 showing a filter housing formed to include a large fluid inlet port and a pump mount flange, a round end cap, a filter media comprising a sleeve made of filter material, and a base configured to mate with and close an opening into the filter housing, the base being formed to include a fluid outlet port;

FIG. 6 is a perspective view of the transaxle filter of FIG. 5 after assembly of the components illustrated in FIG. 5;

DETAILED DESCRIPTION OF THE DRAWINGS

Figure 1:
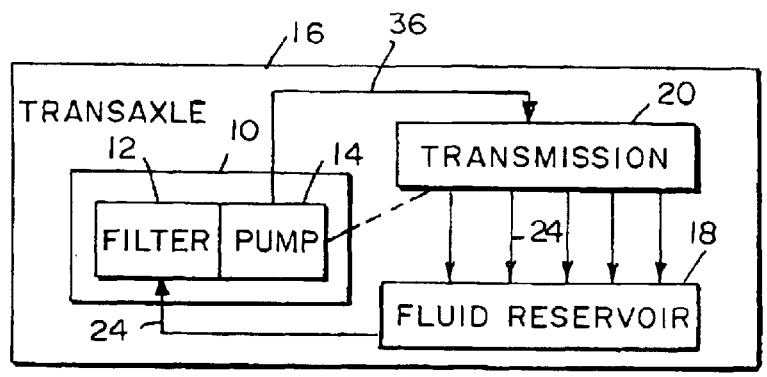
FIG. 1 is a diagrammatic view of a vehicle transaxle comprising a transmission, a transmission fluid reservoir, a pump for pumping transmission fluid from the fluid reservoir to the transmission, and a filter for filtering transmission fluid that passes from the fluid reservoir into the pump.
Figure 2:
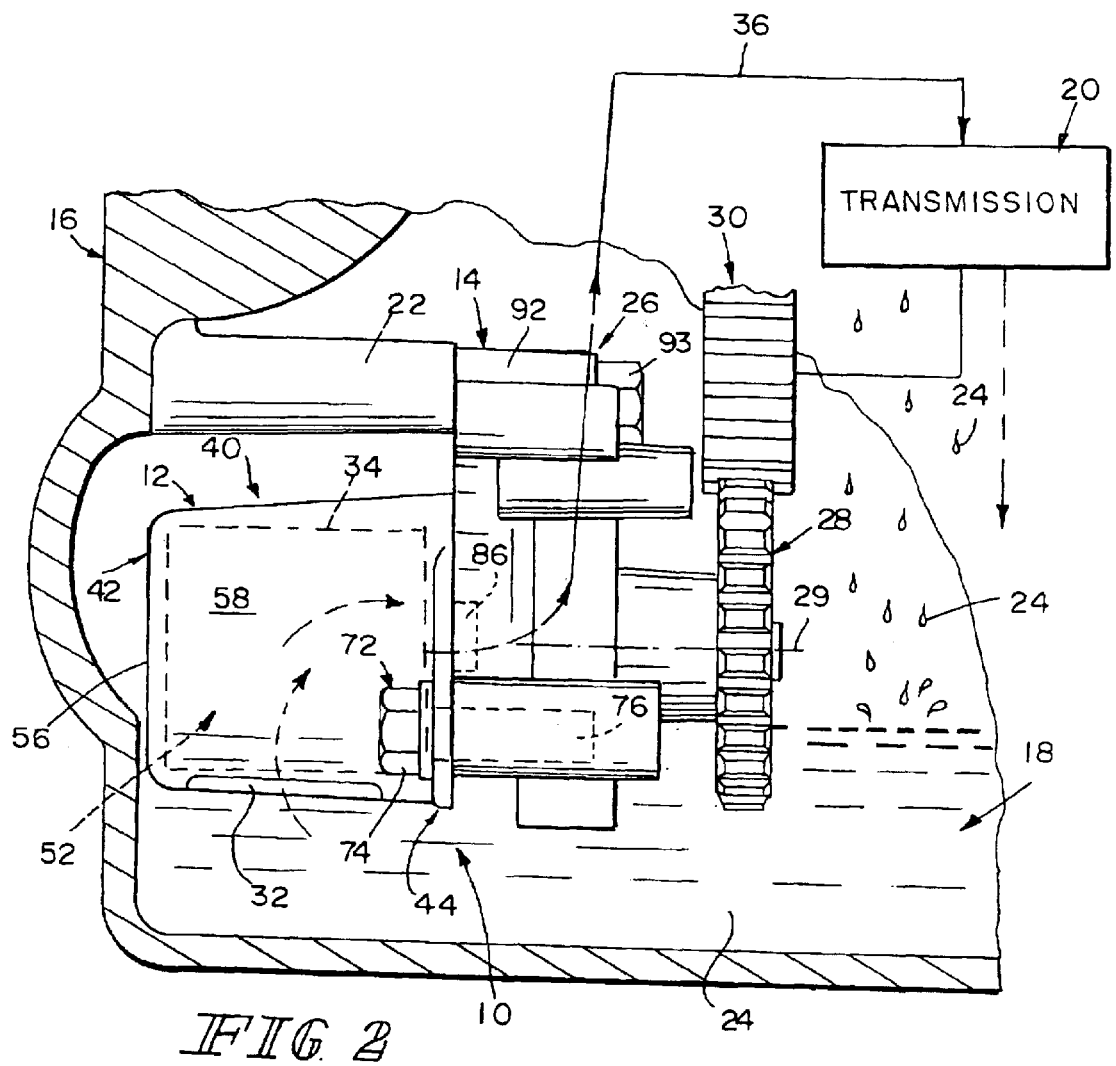
FIG. 2 is an illustrative view of a filter and pump in accordance with the present disclosure mounted in a transaxle housing to pump transmission fluid from a fluid reservoir in the housing to a transmission.

A fluid filter assembly 10 including a filter 12 and a fluid pump 14 is adapted to be mounted in a transaxle housing 16 to filter transmission fluid drawn from a filter reservoir 18 and delivered to a transmission 20 as shown diagrammatically in FIG. 1 and illustratively in FIG. 2. Filtered transmission fluid is used to lubricate bearings and gears (not shown) included in transmission 20 mounted inside transaxle housing 16 and then collected in fluid reservoir 18. Fluid pump 14 operates to draw "dirty" transmission fluid from fluid reservoir 18 and pass it through filter 12 so that only cleaned, filtered transmission fluid is delivered by fluid pump 14 to transmission 20.

As suggested in FIG. 2, fluid pump 14 is mounted on posts 22 included in transaxle housing 16 to lie near transmission fluid 24 collected in fluid reservoir 18. Fluid pump 14 includes a pump housing 26 and a rotatable driven gear 28 arranged to turn a fluid pump mechanism (not shown) provided inside pump housing 26. In the illustrated embodiment, a drive gear 30 associated with transmission 20 is rotated to rotate driven gear 28 about axis 29 and operate the fluid pump mechanism (not shown) provided inside pump housing 26.

As also suggested in FIG. 2, filter 12 is mounted on pump housing 26 to cause a side inlet port 32 to lie submerged in transmission fluid 24 collected in the fluid reservoir 18. During operation of fluid pump 14, "dirty" transmission fluid 24 that has collected in fluid reservoir 18 is drawn into filter 12 through side inlet port 32 and passed through a filter media 34 provided inside filter 12 to provide a flow of filtered transmission fluid 36 that is pumped to transmission 20. It is within the scope of this disclosure to pump this filtered transmission fluid 36 to an electric motor (not shown) also mounted inside transaxle housing 16 to act as a coolant for the electric motor in addition to acting as a lubricant for the bearings and gears included in transmission 20.

As shown, for example, in FIG. 5, filter 12 includes a shroud 40 formed to include a filter housing 42 and a mount flange 44 coupled to filter housing 42. Filter 12 also includes a filter module 46 including filter media 34 and end cap 48 and a base 50. Filter housing 42 is formed to include a filter chamber 52 as shown, for example, in FIG. 5, which filter chamber 52 is sized to contain filter module 46 therein as shown, for example, in FIG. 6. Base 50 is sized to close a filter-receiving opening 54 formed in filter housing 42.

Shroud 40 is monolithic and made of a plastics material in the illustrated embodiments. Manufacturing and installation costs associated with fluid filter assembly 10 are minimized owning to the monolithic character of shroud 40.

Shroud 40 is preferably injection-molded from a thermoplastic material which is chemically inert and which can withstand temperatures in excess of 200° C. for prolonged periods. Suitable thermoplastic resins include commercially available polyetherimide resins with a heat deflection temperature at 264 PSI of 392° F., polyphenylsulfone resins with a heat deflection temperature at 264 PSI of 405° F., or polyphthalamide resins with a heat deflection temperature at 264 PSI of 549° F. The thermoplastic resins may optionally include a glass reinforcing filler material. It is also contemplated that the shroud may be made of a suitable heat and corrosion resistant metal such as, e.g., stainless steel.

Filter housing 42 includes an end wall 56 and a side wall 58 arranged to extend from end wall 56 to mount flange 44 as shown, for example, in FIG. 5. End wall 56 and side wall 58 cooperate to define filter chamber 52. Side wall 58 is formed to include side inlet port 32 as shown, for example, in FIGS. 2 and 5. Side wall 58 terminates at a distal edge 60 located in spaced-apart relation to end wall 56 to define filter-receiving opening 54. In the illustrated embodiment, distal edge 60 comprises a first straight segment 61, a second straight segment 62 arranged to mate with first straight segment 61 to define a right angle therebetween, and a curved segment 63 interconnecting straight segments 61, 62 as shown, for example, in FIG. 5. Although it is within the scope of this disclosure to form end wall 56 as component separate from side wall 58 and couple end wall 56 to side wall 58 using a "hot-plate bonding" technique or other suitable bonding or coupling technique, forming filter housing 42 as a monolithic component is presently preferred.

Base 50 includes a plate 64 that is sized to fit snugly in and close the filter-receiving opening 54 defined by distal edge 60 (61, 62, 63) of filler housing side wall 58 as suggested in FIGS. 5 and 6. Plate 64 is formed to include fluid outlet port 66. A circular rim 68 is appended to an exterior side of plate 64 and arranged to mate with pump housing 26 when filter 12 is mounted on pump 14. It is within the scope of this disclosure to retain base 50 in a mounted position on filter housing 42 using a snap-in-place method, a heat-stake method, or any other suitable retention method.

Mount flange 44 is cantilevered to side wall 58 to extend in a direction away from filler-receiving opening 54 formed in filter housing 42 as shown, for example, in FIG. 5. Mount flange 44 is formed to include an aperture 70 as shown, for example, in FIGS. 5 and 6. A retainer 72 is arranged to pass through aperture 70 to retain mount flange 44 in a fixed position on pump housing 26 as shown, for example, in FIGS. 2–4. In the illustrated embodiment, retainer 72 is a bolt including a head 74 and a threaded shaft 76 coupled to head 74.

Filter media 34 includes an exterior portion 80 and an interior portion 82 as shown, for example, in FIG. 5. Although filter media 34 is made illustratively of a pleated stainless steel mesh material, it is within the scope of this disclosure to use any suitable filter material (e.g., nylon or paper) to make filter media 34.

Filter media 34 is positioned to lie in filter chamber 52 to cause fluid admitted into filter chamber 52 through side inlet port 32 to contact exterior portion 80 and pass through filter media 34 to reach a filtered-fluid region 84 defined by interior portion 82. End cap 48 is bonded to one end of filter media 34 using any suitable technique to close an opening into filtered-fluid region 84 so that all filtered transmission fluid 36 in that region 84 is discharged into fluid pump 14 through fluid outlet port 66 formed in base 50. Pump housing 26 is formed to include a fluid inlet port 86 (as suggested in FIG. 2) to receive filtered transmission fluid 36 discharged from filter 12 through fluid outlet port 66 formed in base 50.

Figure 3:
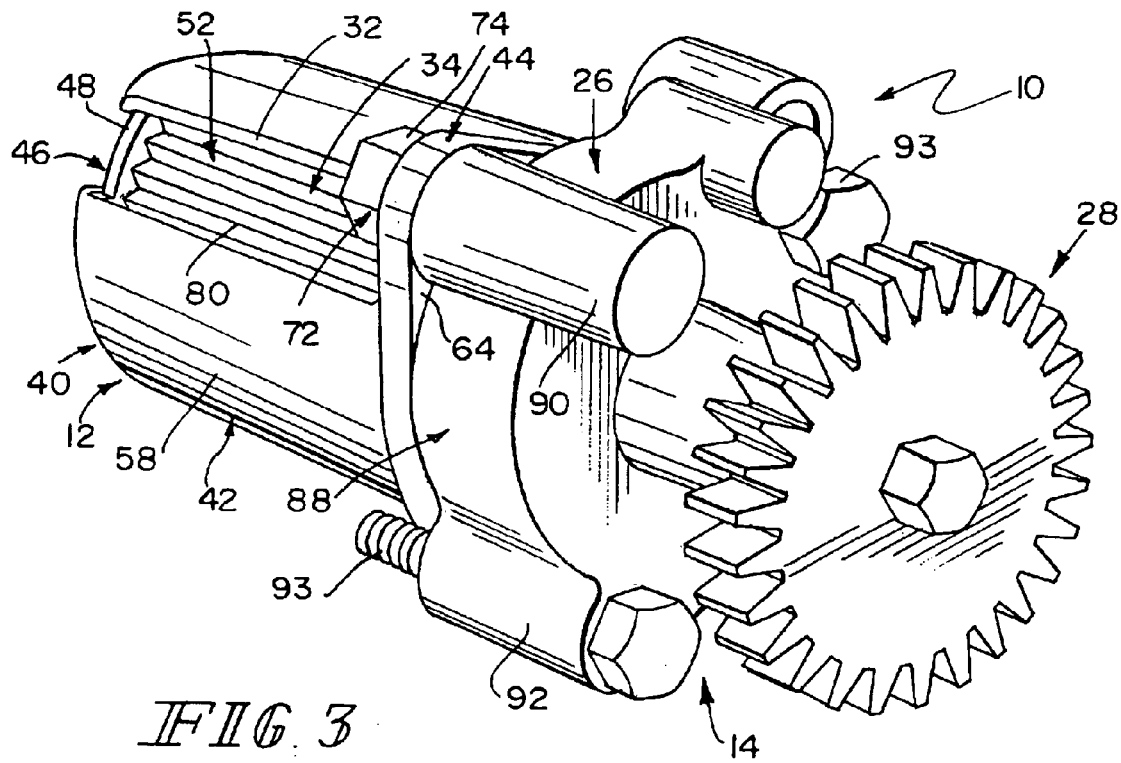
FIG. 3 is a first perspective view of the filter and pump of FIG. 2.
Figure 4:
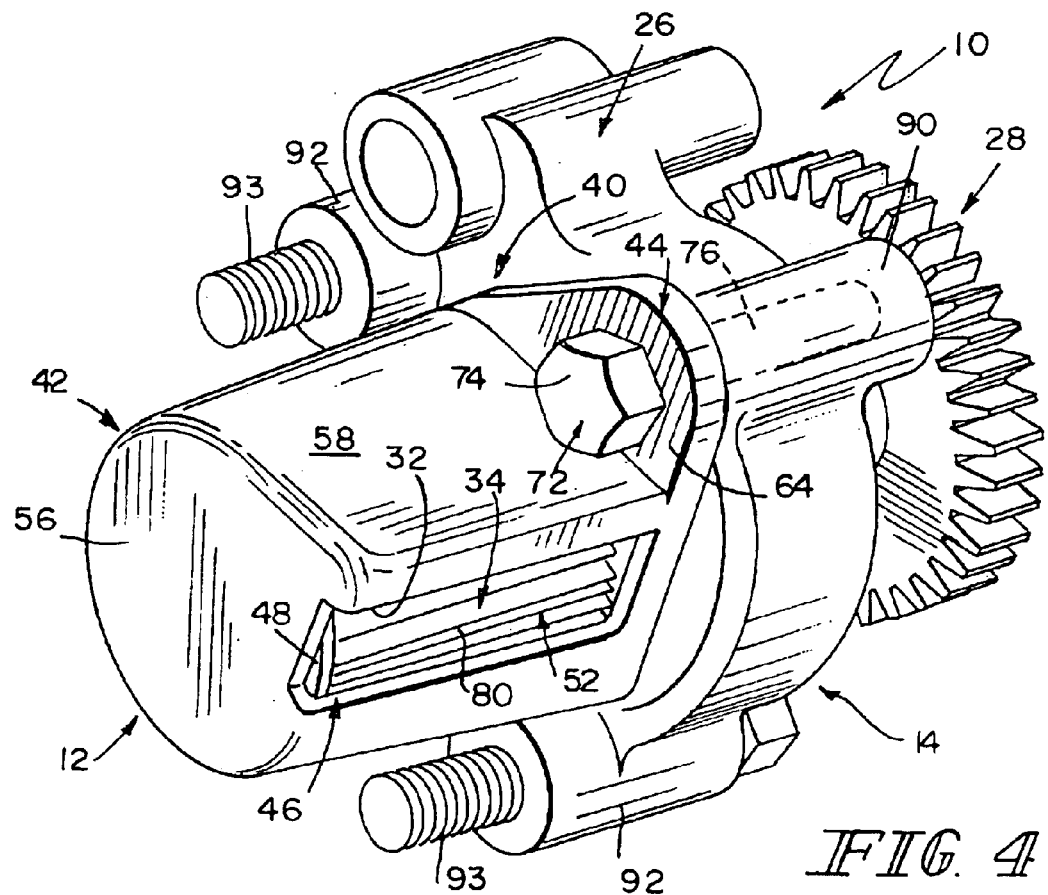
FIG. 4 is a second perspective view of the filter and pump of FIG. 2.
Figure 7:
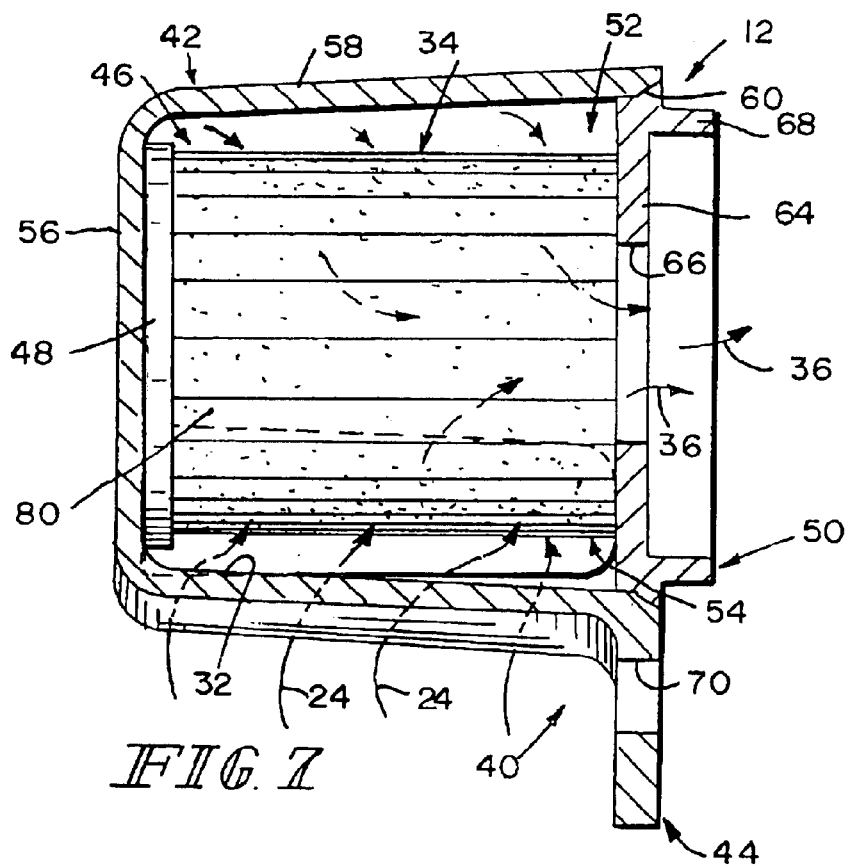
FIG. 7 is a sectional view taken along line 7—7 of FIG. 6 showing a fluid flow path through the transaxle filter from the fluid inlet port to the fluid outlet port.

Pump housing 26 is shown best in FIGS. 2–4. Pump housing 26 includes a body 88 formed to include fluid inlet port 86 and contain a fluid-pumping mechanism (not shown). Pump housing 26 also includes a retainer post 90 coupled to body 88 and formed to receive retainer 72 to fix filter 12 in a mounted position on pump 14 as shown, for example, in FIGS. 2–4. Posts 92 are also coupled to body 88 as shown, for example, in FIGS. 3 and 4 and configured to receive retainers 93 to fix pump 14 in a mounted position on transaxle housing 16 as shown, for example, in FIG. 2. Body 88, posts, and retainers 93 cooperate to define a "filter mount" that is coupled to transaxle housing 16 and to mount flange 44 to place side inlet port 32 formed in shroud 40 in fluid reservoir 18 to cause transmission fluid 24 in fluid reservoir 18 to pass into filter chamber 52 in filter housing 42 through side inlet port 32. The fluid-pumping mechanism (not shown) inside body 88 provides means for pumping filtered fluid 36 discharged from filter chamber 52 through fluid outlet port 66 formed in base 50 so that dirty transmission fluid 24 is drawn into filter chamber 52 from fluid reservoir 18 to be filtered in filter module 46 and then filtered fluid 36 discharged from filter chamber 52 is pumped to a destination (e.g., transmission and/or electric motor) inside transaxle housing 16.

Figure 8:
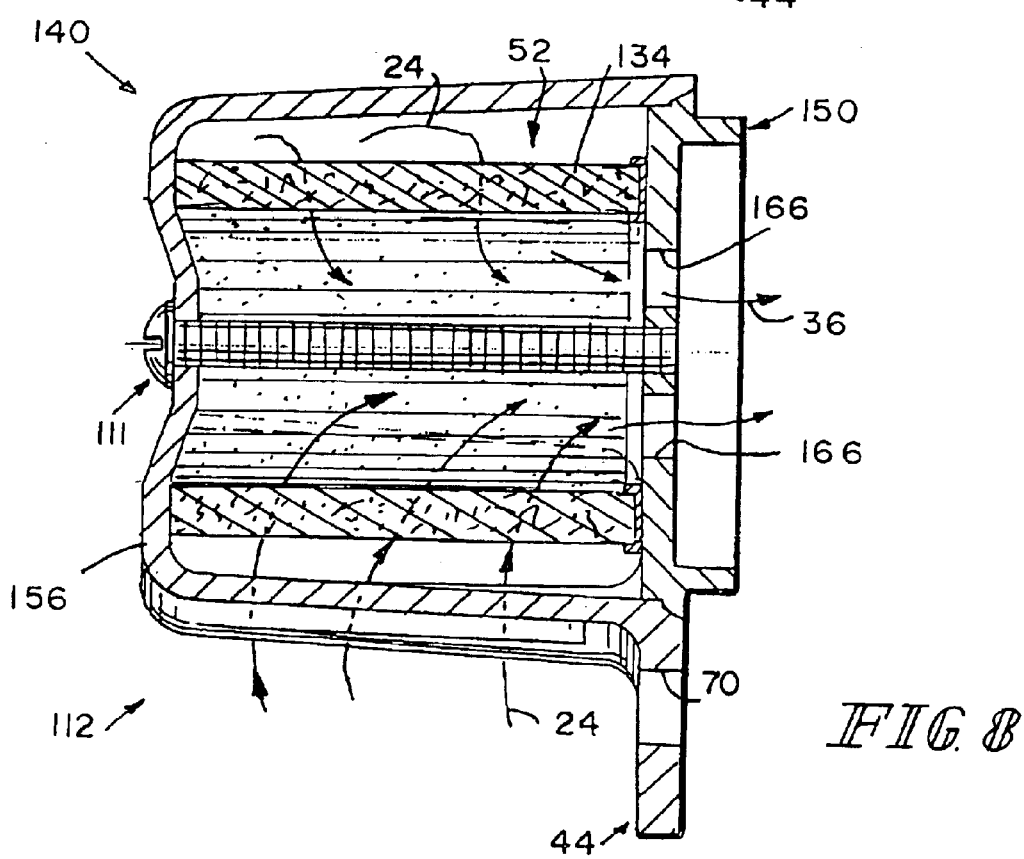
FIG. 8 is a sectional view similar to FIG. 7 showing a transaxle filter in accordance with a second embodiment of this disclosure.

In the embodiment illustrated in FIG. 8, a fluid filter 112 includes a shroud 140 coupled to base 150 using a retainer 111. Base 150 is formed to include a plurality (e.g, four) of fluid outlet ports 166. End wall 156 of shroud 140 functions as the "end cap" for filter media 134.

Figure 9:
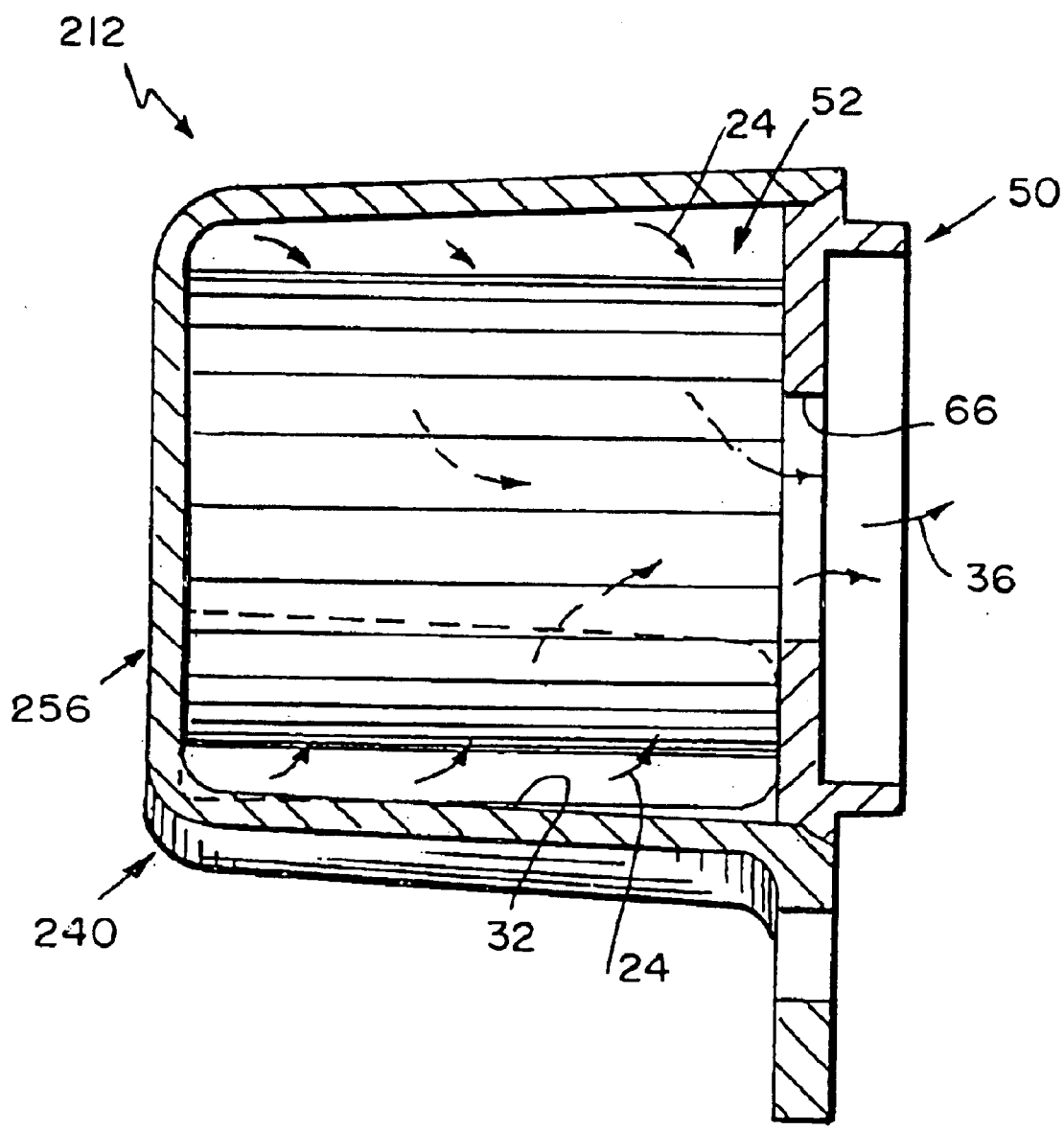
FIG. 9 is a sectional view similar to FIGS. 7 and 8 showing a transaxle filter in accordance with a third embodiment of this disclosure.

In the embodiment illustrated in FIG. 9, a fluid filter assembly 210 includes a shroud 240. End wall 256 of shroud 240 functions as the "end cap" for filter media 234.

What is claimed is:

1. A filter assembly comprising:
    a shroud formed to include a filter housing, said housing having a closed end wall, a sidewall surrounding a longitudinal axis and extending from said closed end wall to an open end, and a mount flange coupled to the filter housing at said open end and extending radially outwardly relative to said longitudinal axis, said mount flange being adapted to mount on a fluid pump arranged to lie alongside the shroud, the filter housing being formed to include a filter chamber, a filter-receiving opening at said open end extending into the chamber, and a fluid inlet port provided in said sidewall,
    a base formed to include a fluid outlet port and mounted on the filter housing to close the filter-receiving opening into the filter chamber, wherein said base includes a radially outermost periphery that is disposed radially inward of said mount flange relative to the longitinal axis of said filter housing, and
    a cylindrical filter media positioned to lie in the filter chamber, the filter media including an exterior portion located in the filter chamber to contact fluid admitted into the filter chamber through the fluid inlet port, the filter media being formed to include an interior portion defining a filtered-fluid region located in the filter media to receive fluid that has passed through the filter media from the exterior portion to the interior portion and arranged to discharge filtered fluid from the filter chamber through the fluid outlet port formed in the base.

2. The assembly of claim 1, further comprising a fluid pump including a pump housing formed to include a fluid inlet port and arranged to lie in a mounted position on the shroud alongside the mount flange and the base to place the fluid outlet port formed in the base in fluid communication with the fluid inlet port formed in the pump housing and a retainer coupled to the mount flange and the pump housing to retain the pump housing in the mounted position on the shroud.

3. The assembly of claim 2, wherein the shroud is monolithic and made of a plastics material, the mount flange is formed to include an aperture, and the retainer passes through the aperture formed in the mount flange.

4. The assembly of claim 1, wherein the shroud is monolithic and made of a plastics material.

5. The assembly of claim 1, wherein the filter assembly further includes a retainer coupled to the mount flange and for coupling to the fluid pump to retain the fluid pump in a mounted position on the shroud to recieve filtered fluid discharged from the filter chamber.

6. The assembly of claim 5, wherein the mount flange is formed to include an aperture and the retainer passes through the aperture formed in the mount flange.

7. The assembly of claim 1, further comprising a transaxle housing containing a fluid reservoir and a filter mount coupled to the transaxle housing and wherein the mount flange is coupled to the filter mount to place the side inlet port formed in the shroud in the fluid reservoir to cause fluid in the fluid reservoir to pass into the filter chamber through the side inlet port.

8. The assembly of claim 7, wherein the filter mount is formed to include means for pumping filtered fluid discharged from the filter chamber through the fluid outlet port formed in the base so that fluid is drawn into the filter chamber from the fluid reservoir to be filtered in the filter media and then filtered fluid discharged from the filter chamber is pumped to a destination inside the transaxle housing.

9. The assembly of claim 1, wherein said filter media includes a closed end adjacent the closed end wall of the housing and an open end sealed to said base about said fluid outlet port.

10. The assembly of claim 9, further comprising an end cap for closing the closed end of said cylindrical filter media.

11. The assembly of claim 9, wherein the dosed end of said cylindrical filter media is closed by the closed end wall of said housing.

12. The assembly of claim 11, wherein said base is separable from said housing for permitting replacement of said cylindrical filter media, and further comprising a retainer for releasably retaining said base to the open end of said housing.

13. The assembly of claim 12, wherein said retainer is a bolt extending through the closed end wall of said housing and through the interior portion of said cylindrical filter media and threadedly engaged to said base.

14. The assembly of claim 11, further comprising a plurality of said fluid outlet ports.

15. The assembly of claim 1, wherein said base comprises a plate sized to snugly fit within said filter-receiving opening.

16. The assembly of claim 15, wherein said plate includes an interior surface adjacent said filter chamber and an exterior surface opposite said interior surface, and a circular rim surrounding said fluid outlet port and extending axially from the exterior surface of said base.

17. The assembly of claim 15, wherein said filter-receiving opening includes a curved segment, a first straight segment, and a second straight segment.

* * * * *